(12) United States Patent
Cheng

(10) Patent No.: US 12,453,522 B2
(45) Date of Patent: Oct. 28, 2025

(54) FOLDABLE DETECTION DEVICE AND IMAGE SIGNAL PROCESSING METHOD FOR FOLDABLE DETECTION DEVICE

(71) Applicant: InnoCare Optoelectronics Corporation, Tainan (TW)

(72) Inventor: Sung-Pao Cheng, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 363 days.

(21) Appl. No.: 18/316,250

(22) Filed: May 12, 2023

(65) Prior Publication Data
US 2023/0404498 A1    Dec. 21, 2023

(30) Foreign Application Priority Data

Jun. 21, 2022 (TW) .................................. 111122957

(51) Int. Cl.
*A61B 6/00* (2024.01)
*A61B 6/58* (2024.01)
(52) U.S. Cl.
CPC .......... *A61B 6/4405* (2013.01); *A61B 6/4452* (2013.01); *A61B 6/585* (2013.01)

(58) Field of Classification Search
CPC ........................... A61B 6/4266; A61B 6/4405
See application file for complete search history.

(56) References Cited

U.S. PATENT DOCUMENTS

| 2019/0120977 A1* | 4/2019 | Jacobs | ................ G01T 1/20188 |
| 2023/0114712 A1* | 4/2023 | Saito | ..................... G06F 3/0412 |
| | | | 345/173 |

FOREIGN PATENT DOCUMENTS

CN            104170051            5/2017

* cited by examiner

*Primary Examiner* — Dani Fox
(74) *Attorney, Agent, or Firm* — JCIPRNET

(57) ABSTRACT

A foldable detection device and an image signal processing method for the foldable detection device are provided. The foldable detection device is used in an unfolded state and a folded state. The foldable detection device includes a first detection panel and a second detection panel. When the foldable detection device is in the unfolded state, the first detection panel and the second detection panel partially overlap in a direction of a top view of the foldable detection device.

20 Claims, 6 Drawing Sheets

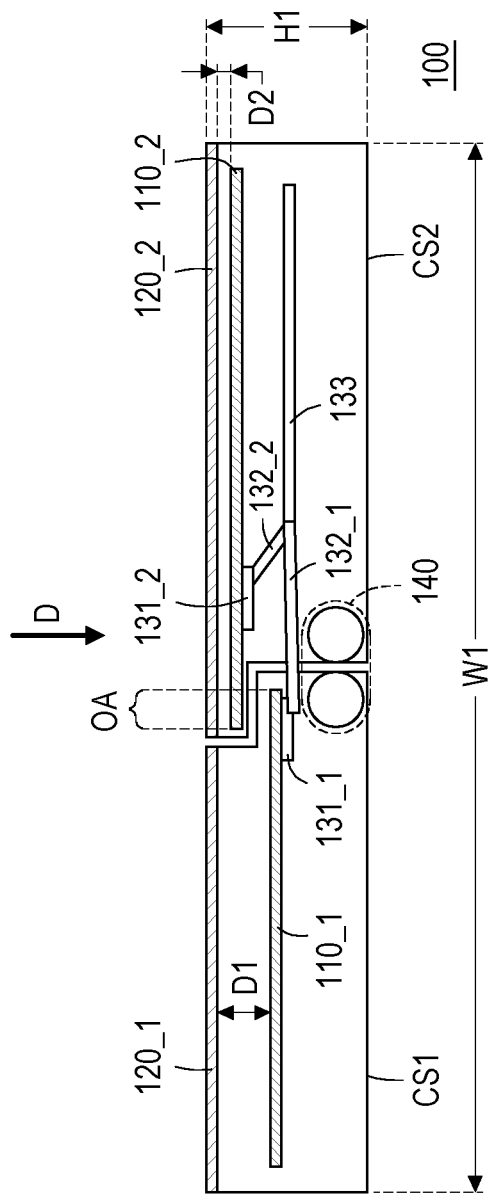
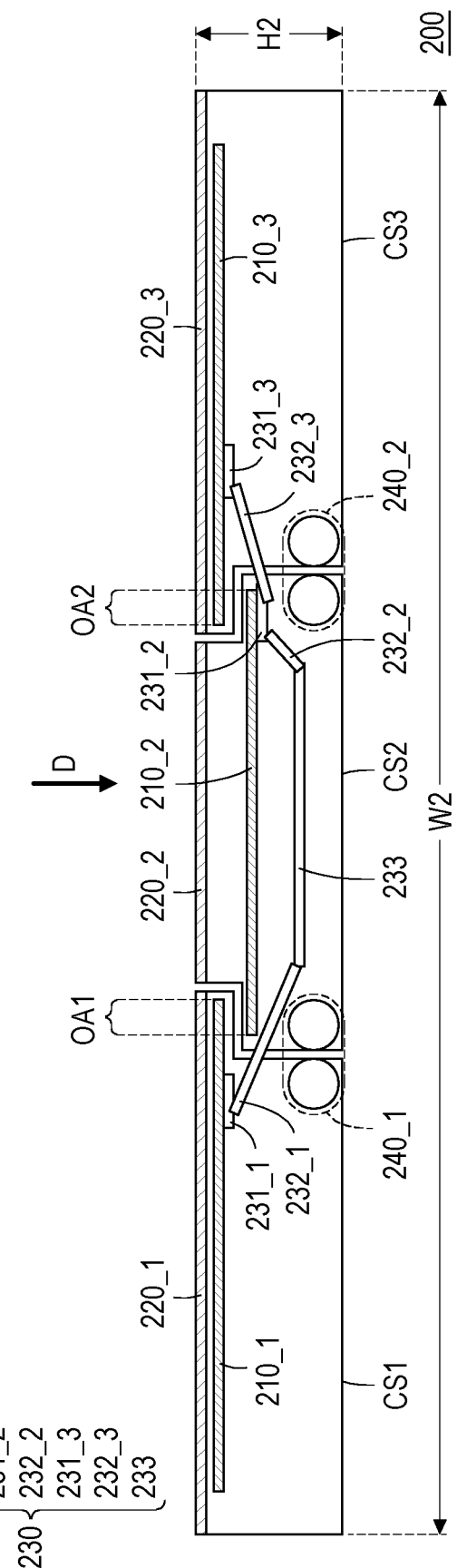
FIG. 2A
FIG. 2B

FOLDABLE DETECTION DEVICE AND IMAGE SIGNAL PROCESSING METHOD FOR FOLDABLE DETECTION DEVICE

CROSS-REFERENCE TO RELATED APPLICATION

This application claims the priority benefit of Taiwan application serial no. 111122957, filed on Jun. 21, 2022. The entirety of the above-mentioned patent application is hereby incorporated by reference herein and made a part of this specification.

BACKGROUND

Technical Field

The disclosure relates to a detection device and an image signal processing method for the detection device, and in particular, relates to a foldable detection device and an image signal processing method for the foldable detection device.

Description of Related Art

When there is a need for large-area detection, a detection device needs a detection panel with a large detection area. For instance, in cases where X-rays are used for detection in medical treatment, health examination, or security check, it is necessary to increase the size of the detection panel of the detection device to meet the need. However, due to the increased area of the detection panel, it is difficult to move or transport the detection device, and the risk of damage caused by the collision of foreign objects is also significant.

Therefore, how to provide a detection device that may be easily moved or transported is an important issue in the art.

SUMMARY

The disclosure provides a foldable detection device used in an unfolded state and a folded state and an image signal processing method for the foldable detection device.

The disclosure provides a foldable detection device used in an unfolded state and a folded state. The foldable detection device includes a first detection panel and a second detection panel. When the foldable detection device is in the unfolded state, the first detection panel and the second detection panel partially overlap in a direction of a top view of the foldable detection device.

The disclosure further provides an image signal processing method applicable to a foldable detection device. The foldable detection device is used in an unfolded state and a folded state. The foldable detection device includes a first detection panel and a second detection panel. The image signal processing method includes the following steps. the foldable detection device is adjusted to the unfolded state. The first detection panel generates a first calibrated image signal according to a first parameter. The second detection panel generates a second calibrated image signal according to a second parameter. One of the first calibrated image signal and the second calibrated image signal is treated as a base image signal, and the other calibrated image signal is modified to generate a modified image signal. The base image signal and the modified image signal are merged.

To sum up, the foldable detection device is used in the unfolded state and the folded state. In this way, when being in the folded state, the first detection panel and the second detection panel of the foldable detection device are suitable for large-area detection. In the folded state, the foldable detection device may be easily moved or transported or is suitable for small-area detection. In addition, in the image signal processing method, one of the first calibrated image signal and the second calibrated image signal is modified, and the first calibrated image signal and the second calibrated image signal are merged. In this way, the first calibrated image signal and the second calibrated image signal may be spliced into a large-area image signal.

To make the aforementioned more comprehensible, several embodiments accompanied with drawings are described in detail as follows.

BRIEF DESCRIPTION OF THE DRAWINGS

FIG. 2A is a side view illustrating the foldable detection device in the unfolded state according to the first embodiment of the disclosure.

FIG. 2B is a side view illustrating the foldable detection device in the unfolded state according to the second embodiment of the disclosure.

DESCRIPTION OF THE EMBODIMENTS

Figure 1:
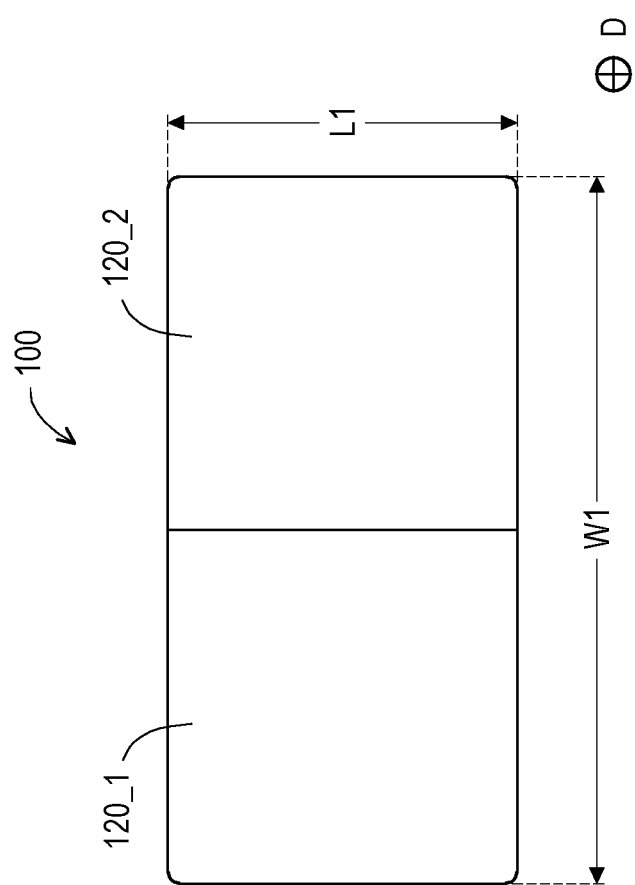
FIG. 1 is a top view illustrating a foldable detection device in an unfolded state according to an embodiment of the disclosure.

Several embodiments of the disclosure are described in detail below accompanying with figures. In terms of the reference numerals used in the following description, the same reference numerals in different figures should be considered as the same or the like elements. The embodiments are only a portion of the disclosure, which do not present all embodiments of the disclosure. More specifically, these embodiments are only examples in the scope of the patent application of the disclosure.

Throughout the specification and appended claims of the disclosure, certain terms are used to refer to specific elements. A person having ordinary skill in the art should understand that electronic device manufacturers may refer to the same elements by different names. In the specification, it is not intended to distinguish between elements that have the same function but different names. In the following specification and claims, the words "containing" and "including" are open-ended words and therefore should be interpreted as "containing but not limited to . . . ".

In the following embodiments, wording used to indicate directions, such as "up", "down", "front", "back", "left", and "right" merely refers to directions in the accompanying figures. Therefore, the directional wording is used to illustrate rather than limit the disclosure. In the accompanying figures, common characteristics of the methods, structures, and/or materials used in specific embodiments are shown. However, the accompanying drawings should not be interpreted to define or limit the scopes or the properties of the description in the embodiments. For instance, the relative size, thickness, and location of each film layer, region, and/or structure may be reduced or enlarged for clarity.

In some embodiments of the disclosure, regarding the words such as "bonded", "connected", "interconnected", etc. referring to bonding and connection, unless specifically defined, these words mean that two structures are in direct contact or two structures are not in direct contact, and other structures are provided to be disposed between the two structures. The word for joining and connecting may also include the case where both structures are movable or both structures are fixed. In addition, the word "coupled" may include to any direct or indirect electrical connection means. In the case of direct electrical connection, the terminals of the elements on the two circuits are directly connected or connected to each other by a conductor line segment. In the case of indirect electrical connection, a switch, diode, capacitor, inductor, resistor, other suitable elements, or a combination of the above components is provided between the terminals of the elements on the two circuits, but the disclosure is not limited thereto.

The terms "about", "equal to", "identical" or "same", "substantially", or "approximately" are generally interpreted as being within 20% of a given value or range or are interpreted as being within 10%, 5%, 3%, 2%, 1%, or 0.5% of a given value or range.

In the disclosure, the thickness, length, and width may be measured by an optical microscope (OM), and the thickness may be measured from a cross-sectional image in an electron microscope, but it is not limited thereto. In addition, a certain error may be provided between any two values or directions used for comparison. In addition, the wordings "the given range is from the first numerical value to the second numerical value" and "the given range falls within the range of the first numerical value to the second numerical value" mean that the given range includes the first numerical value, the second numerical value, and other numerical values therebetween. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

The ordinal numbers used in the specification and claims, such as "first", "second", etc., are used to modify the elements, and they do not imply or represent the (or these) elements have any previous ordinal numbers, do not represent the order of a element and another element, or the order of a manufacturing method. The use of these ordinal numbers is only used to clearly distinguish an element with a certain name from another element with the same name. The terms used in the claims and the specification may not have to be the same, and accordingly, the first component provided in the specification may be the second component in the claims. It should be understood that in the following embodiments, the technical features of several different embodiments may be replaced, recombined, and mixed to complete other embodiments without departing from the spirit of the disclosure.

It should be understood that in the following embodiments, the features of several different embodiments may be replaced, recombined, and mixed to complete other embodiments without departing from the spirit of the disclosure. As long as the features of the embodiments do not violate or do not conflict with the spirit of the disclosure, they may be mixed and matched arbitrarily.

Unless otherwise defined, all terms (including technical and scientific terms) used herein have the same meaning as commonly understood by a person of ordinary skill in the art. It will be further understood these terms, such as those defined in commonly used dictionaries, should be interpreted as having meaning that is consistent with their meaning in the context of the related art and the disclosure and should not be interpreted in an idealized or overly formal sense unless expressly so defined herein.

The electronic device of the disclosure may include but not limited to a display device, a backlight device, an antenna device, a sensing/detecting device, or a splicing device. The electronic device may be a bendable or flexible electronic device. The display device may be a non-self-luminous display device or a self-luminous display device. The antenna device may be a liquid crystal antenna device or a non-liquid crystal antenna device, and the sensing/detecting device may be a device that senses capacitance, light, heat, or ultrasound, but it is not limited thereto. In the disclosure, the electronic device may include an electronic element, and the electronic element may include a passive element and an active element, such as a capacitor, a resistor, an inductor, a diode, a transistor, etc. The diode may include a light emitting diode (LED) or a photodiode. The light emitting diode may include but not limited to an organic LED (OLED), a sub-millimeter LED (mini LED), a micro LED, or a quantum dot LED. The splicing device may be, for example, a display splicing device or an antenna splicing device, but it is not limited thereto. Note that the electronic device may be any combination of the foregoing, but it is not limited thereto. Hereinafter, the detecting device will be used as the electronic device or the splicing device to illustrate the disclosure, but the disclosure is not limited thereto.

With reference to FIG. 1 and FIG. 2A together, FIG. 1 is a top view illustrating a foldable detection device in a first state (e.g., unfolded state) according to an embodiment of the disclosure. FIG. 2A is a side view illustrating the foldable detection device in the first state (e.g., unfolded state) according to the first embodiment of the disclosure. In this embodiment, a foldable detection device 100 may be switched between the first state and a second state. The detection area of the foldable detection device 100 in the first state is greater than the detection area of the foldable detection device 100 in the second state. The first state is, for example, an unfolded state. The second state is, for example, a folded state. In other words, the foldable detection device 100 may provide a larger detection area when it is in an unfolded state or may have a smaller detection area when it is in a folded state. The foldable detection device 100 in the unfolded state has a width W1, a length L1, and a thickness H1. For instance, the width W1 is approximately 120 cm, the length L1 is approximately 70 cm, and the thickness H1 is approximately 1.5 cm, but the dimensions of provided by the disclosure are not limited to thereto. In this embodiment, the foldable detection device 100 may be an X-ray detection device based on medical, health examination, or security check applications, but the disclosure is not limited thereto.

In this embodiment, the foldable detection device 100 includes a first detection panel 110_1 and a second detection panel 110_2. When the foldable detection device 100 is in the unfolded state, the first detection panel 110_1 and the second detection panel 110_2 are in the unfolded state, that is, light-receiving surfaces of the first detection panel 110_1 and the second detection panel 110_2 face the same direction. When the foldable detection device 100 is in the folded state, the light-receiving surfaces of the first detection panel 110_1 and the second detection panel 110_2 face different directions, for example, opposite directions. The first detection panel 110_1 and the second detection panel 110_2 may be used to detect light signals from outside the foldable detection device 100. In this way, when being in the unfolded state, the foldable detection device 100 may be suitable for detection requirements of a larger area.

The first detection panel 110_1 includes a plurality of first detection sub-pixels, and the second detection panel 110_2 includes a plurality of second detection sub-pixels. When the foldable detection device 100 is in the unfolded state, in a direction D of a top view of the foldable detection device 100, the first detection panel 110_1 and the second detection panel 110_2 can use the detection sub-pixels to generate a first image signal and a second image signal. In an embodiment, the first detection panel 110_1 and the second detection panel 110_2 may simultaneously generate the first image signal and the second image signal. The first image signal and the second image signal disclosed in the disclosure may be used on a display device to generate a first image and a second image. The first detection panel 110_1 and the second detection panel 110_2 partially overlap to form an overlapping zone OA. For instance, at least one first detection sub-pixel column or at least one first detection sub-pixel row of the first detection panel 110_1 and at least one second detection sub-pixel column or at least one second detection sub-pixel row of the second detection panel 110_2 are located in the overlapping zone OA. The width of the overlapping zone OA is less than the width W1. It should be noted that part of the first image signal generated by the first detection panel 110_1 corresponding to the overlapping zone OA and/or part of the second image signal generated by the second detection panel 110_2 corresponding to the overlapping zone OA may be configured to perform image signal processing of at least one of the first image signal and the second image signal. In this way, based on the overlapping zone OA, the visual discontinuity of the first image and the second image during splicing is lowered.

In this embodiment, the foldable detection device 100 further includes a first cover plate 120_1 and a second cover plate 120_2. The first cover plate 120_1 is disposed on the first detection panel 110_1. The first cover plate 120_1 can protect the first detection panel 110_1 to reduce damage caused by scratches or collisions on the first detection panel 110_1. The second cover plate 120_2 is disposed on the second detection panel 110_2. The second cover plate 120_2 can protect the second detection panel 110_2 to reduce damage caused by scratches or collisions on the second detection panel 110_2.

In addition, the first cover plate 120_1 may also reduce the probability of the first detection panel 110_1 receiving visible light in the environment. The second cover plate 120_2 may also reduce the probability of the second detection panel 110_2 receiving visible light in the environment.

Further, the first detection panel 110_1 includes a first light conversion layer (not shown), and the first light conversion layer is disposed between the first cover plate and the first detection sub-pixels. The second detection panel 110_2 includes a second light conversion layer (not shown), and the second light conversion layer is disposed between the second cover plate and the second detection sub-pixels. The first light conversion layer and the second light conversion layer may respectively receive first light (e.g., X-rays) and provide second light (e.g., visible light). Therefore, the first detection sub-pixels in the first detection panel 110_1 may detect the second light provided by the first light conversion layer. The second detection sub-pixels in the second detection panel 110_2 may detect the second light provided by the second light conversion layer. The first cover plate 120_1 covers the first detection panel 110_1. Therefore, the first cover plate 120_1 may prevent the external visible light from affecting the first detection panel 110_1 and reduce the risk of the first image signal being affected. The second cover plate 120_2 covers the second detection panel 110_2. Therefore, the second cover plate 120_1 may prevent the external visible light from affecting the second detection panel 110_1 and reduce the risk of the second image signal being affected. In addition, the first cover plate 120_1 and the second cover plate 120_2 have less influence on the transmittance of X-rays. In other words, the first cover plate 120_1 and the second cover plate 120_2 are less likely to affect the penetration of X-rays, and also less likely to reduce the risk of the first image signal and the second image signal being affected. In this embodiment, each of the first cover plate 120_1 and the second cover plate 120_2 includes a carbon fiber plate, but the disclosure is not limited thereto.

In this embodiment, when the foldable detection device 100 is in the unfolded state, the second cover plate 120_2 does not overlap with the first cover plate 120_1. The first cover plate 120_1 and the second cover plate 120_2 may be coplanar. A first distance D1 is provided between the first cover plate 120_1 and the first detection panel 110_1. A second distance D2 is provided between the second cover plate 120_2 and the second detection panel 110_2. The first detection panel 110_1 and the second detection panel 110_2 partially overlap. Therefore, the first distance is not equal to the second distance. Taking this embodiment as an example, the first distance is greater than the second distance, but the disclosure is not limited thereto.

The foldable detection device 100 further includes a signal transmission structure 130. The signal transmission structure 130 is coupled to the first detection panel 110_1 and the second detection panel 110_2. The signal transmission structure 130 includes a signal connection board 131_1, a signal connection board 131_2, a signal transmission line 132_1, a signal transmission line 132_2, and a control board 133, but the disclosure is not limited thereto. The signal connection board 131_1 is coupled to the first detection panel 110_1. The signal transmission line 132_1 is coupled between the signal connection board 131_1 and the control board 133. The signal connection board 131_2 is coupled to the second detection panel 110_2. The signal transmission line 132_2 is coupled between the signal connection board 131_2 and the control board 133. When the foldable detection device 100 is in the unfolded state, the control board 133 receives the first image signal through the signal connection board 131_1 and the signal transmission line 132_1 and receives the second image signal through the signal connection board 131_2 and the signal transmission line 132_2. The control board 133 may perform image signal processing on the first image signal and the second image signal based on the image signal corresponding to the overlapping zone OA, so that the visual discontinuity of the first image and the second image during splicing is lowered.

In this embodiment, at least one of the signal connection board 131_1, the signal connection board 131_2, the signal transmission line 132_1, the signal transmission line 132_2, and the control board 133 may be implemented by a circuit disposed on a flexible substrate. The control board 133 may be, for example, a circuit board including a central processing unit (CPU), a programmable microprocessor for general or special use, a digital signal processor (DSP), a programmable controller, an application specific integrated circuit (ASIC), a programmable logic device (PLD), or any other similar devices or a combination of the foregoing devices and may be loaded to run a computer program, but the disclosure is not limited thereto.

In this embodiment, the foldable detection device 100 further includes a casing CS1, a casing CS2, and a foldable structure 140. The first detection panel 110_1 is disposed in the casing CS1. The second detection panel 110_2 is disposed in the casing CS2. Further, the foldable structure 140 is pivotally connected to the casing CS1 and the casing CS2. Therefore, the foldable detection device 100 may be switched between the first state (e.g., unfolded state) and the second state (e.g., folded state) through the foldable structure 140. In this embodiment, the control board 133 may be disposed in the casing CS2. In some embodiments, the control board 133 may be disposed in the casing CS1.

With reference to FIG. 2B, FIG. 2B is a side view illustrating the foldable detection device in the unfolded state according to the second embodiment of the disclosure. In this embodiment, a foldable detection device 200 includes a first detection panel 210_1, a second detection panel 210_2, and a third detection panel 210_3. When the foldable detection device 200 is in the first state (e.g., unfolded state), the first detection panel 210_1, the second detection panel 210_2, and the third detection panel 210_3 are unfolded. The first detection panel 210_1, the second detection panel 210_2, and the third detection panel 210_3 may be used to detect light signals from one side of the foldable detection device 200. In this way, when being in the unfolded state, the foldable detection device 200 may be suitable for large-area detection. In the direction D of a top view of the foldable detection device 200, the first detection panel 210_1, the second detection panel 210_2, and the third detection panel 210_3 can generate a first image signal, a second image signal, and a third image signal. In an embodiment, the first detection panel 210_1, the second detection panel 210_2, and the third detection panel 210_3 may simultaneously generate the first image signal, the second image signal, and the third image signal. The first image signal, the second image signal, and the third image signal disclosed in the disclosure may be used on a display device to generate a first image, a second image, and a third image. In this embodiment, the foldable detection device 200 in the unfolded state has a width W2, a length, and a thickness H2.

In an embodiment, the first detection panel 210_1 includes a plurality of first detection sub-pixels. The second detection panel 210_2 includes a plurality of second detection sub-pixels. The third detection panel 210_3 includes a plurality of third detection sub-pixels. When the foldable detection device 200 is in the unfolded state, in the direction D of the top view of the foldable detection device 200, the first detection panel 110_1, the second detection panel 110_2, and the third detection panel 210_3 can simultaneously use the respective detection sub-pixels to generate the first image signal, the second image signal, and the third image signal. The second detection panel 210_2 and the first detection panel 210_1 partially overlap in an overlapping zone OA1. The second detection panel 210_2 and the third detection panel 210_3 partially overlap in an overlapping zone OA2. For instance, at least one first detection sub-pixel column or at least one first detection sub-pixel row of the first detection panel 210_1 and at least one second detection sub-pixel column or at least one second detection sub-pixel row of the second detection panel 210_2 are located in the overlapping zone OA1. At least one third detection sub-pixel column or at least one third detection sub-pixel row of the third detection panel 210_3 and at least one second detection sub-pixel column or at least one second detection sub-pixel row of the second detection panel 210_2 are located in the overlapping zone OA2. Part of the first image signal generated by the first detection panel 210_1 corresponding to the overlapping zone OA1 and/or part of the second image signal generated by the second detection panel 210_2 corresponding to the overlapping zone OA1 may be configured to perform image signal processing on at least one of the first image signal and the second image signal. Part of the third image signal generated by the third detection panel 210_3 corresponding to the overlapping zone OA2 and/or part of the second image signal generated by the second detection panel 210_2 corresponding to the overlapping zone OA2 may be configured to perform image signal processing on at least one of the third image signal and the second image signal. In this way, based on the overlapping zone OA1 and the overlapping zone OA2, the visual discontinuity of the first image, the second image, and the third image during splicing is lowered.

In this embodiment, the foldable detection device 200 further includes a first cover plate 220_1, a second cover plate 220_2, and a third cover plate 220_3. The first cover plate 220_1 is disposed on the first detection panel 210_1. The second cover plate 220_2 is disposed on the second detection panel 210_2. The third cover plate 220_3 is disposed on the third detection panel 210_3. As described above, the first cover plate 220_1, the second cover plate 220_2, and the third cover plate 220_3 may reduce the damage caused by scratches or collisions on the first detection panel 210_1, the second detection panel 210_2, and the third detection panel 210_3 and may also reduce the probability of the first detection panel 210_1, the second detection panel 210_2, and the third detection panel 210_3 receiving visible light in the environment, so description thereof is not repeated herein.

In this embodiment, when the foldable detection device 200 is in the unfolded state, the second cover plate 220_2 does not overlap with the first cover plate 220_1 nor the third cover plate 220_3. In this embodiment, when the foldable detection device 200 is in the unfolded state, the first cover plate 220_1, the second cover plate 220_2, and the third cover plate 220_3 may be coplanar.

In this embodiment, the foldable detection device 200 includes a signal transmission structure 230. The signal transmission structure 230 is coupled to the first detection panel 210_1, the second detection panel 210_2, and the third detection panel 210_3. The signal transmission structure 230 includes a signal connection board 231_1, a signal connection board 231_2, a signal connection board 231_3, a signal transmission line 232_1, a signal transmission line 232_2, a signal transmission line 232_3, and a control board 233, but the disclosure is not limited thereto. The signal connection board 231_1 is coupled to the first detection panel 110_1. The signal transmission line 232_1 is coupled between the signal connection board 231_1 and the control board 233. The signal connection board 231_2 is coupled to the second detection panel 210_2. The signal transmission line 232_2 is coupled between the signal connection board 231_2 and the control board 233. The signal connection board 231_3 is coupled to the third detection panel 210_3. The signal transmission line 232_2 is coupled between the signal connection board 231_2 and the signal connection board 231_3. The coupling among the signal transmission lines, the signal connection boards, and the control board may be modified according to the setting requirements, and the disclosure is not limited thereto. When the foldable detection device 200 is in the unfolded state, the control board 233 receives the first image signal through the signal connection board 231_1 and the signal transmission line 232_1, receives the second image signal through the signal connection board 231_2 and the signal transmission line 232_2, and receives the third image signal through the signal connection board 231_3 and the signal transmission line 232_3. The control board 233 uses part of the first image signal corresponding to the overlapping zone OA1 and/or part of the second image signal corresponding to the overlapping zone OA1 to perform image signal processing on at least one of the first image signal and the second image signal. The control board 233 uses part of the third image signal corresponding to the overlapping zone OA2 and/or part of the second image signal corresponding to the overlapping zone OA2 to perform image signal processing on at least one of the third image signal and the second image signal. In this way, based on the overlapping zone OA1 and the overlapping zone OA2, the visual discontinuity of the first image, the second image, and the third image during splicing may be lowered through the control board 233.

In this embodiment, the foldable detection device 200 further includes a casing CS1, a casing CS2, a casing CS3, a foldable structure 240_1 and a foldable structure 240_2. The first detection panel 210_1 is disposed in the casing CS1. The second detection panel 210_2 is disposed in the casing CS2. The third detection panel 210_3 is disposed in the casing CS3. Further, the foldable structure 240_1 is pivotally connected to the casing CS1 and the casing CS2, and the foldable structure 240_2 is pivotally connected to the casing CS2 and the casing CS3, but the disclosure is not limited thereto.

Therefore, the foldable detection device 200 be in the first state (e.g., unfolded state) by unfolding the first detection panel 210_1, the second detection panel 210_2, and the third detection panel 210_3 through the foldable structure 240_1 and the foldable structure 240_2. The foldable detection device 200 be in the second state (e.g., folded state) by folding the first detection panel 210_1 and the third detection panel 210_3 through the foldable structure 240_1 and the foldable structure 240_2. In an embodiment, the foldable detection device 200 may be in a third state by unfolding the first detection panel 210_1 and the second detection panel 210_2 through the foldable structure 240_1 and folding the third detection panel 210_3 through the foldable structure 240_2. In another embodiment, the foldable detection device 200 may be in a fourth state by unfolding the third detection panel 210_3 and the second detection panel 210_2 through the foldable structure 240_1 and folding the first detection panel 210_1 through the foldable structure 240_2.

Figure 3B:
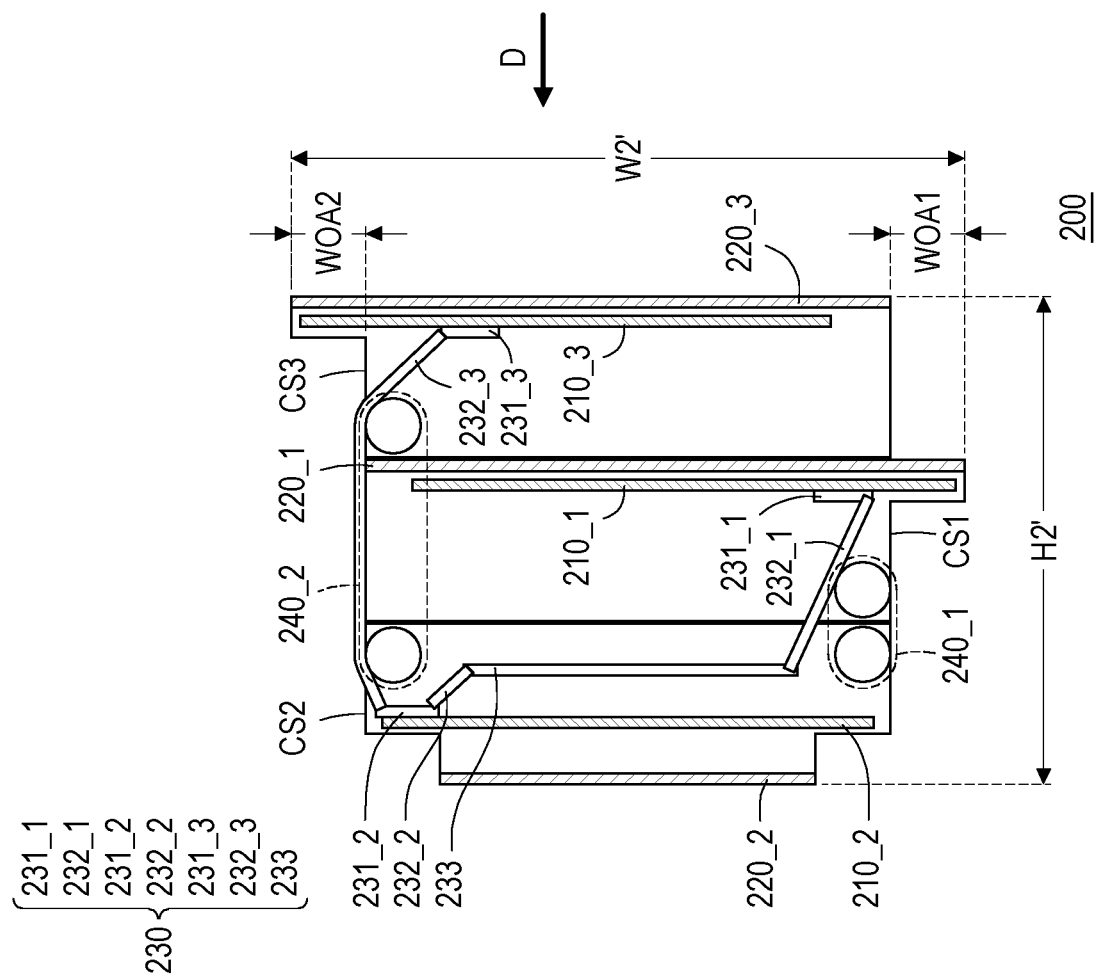
FIG. 3B is a side view illustrating the foldable detection device in the folded state according to the second embodiment of the disclosure.
Figure 3A:
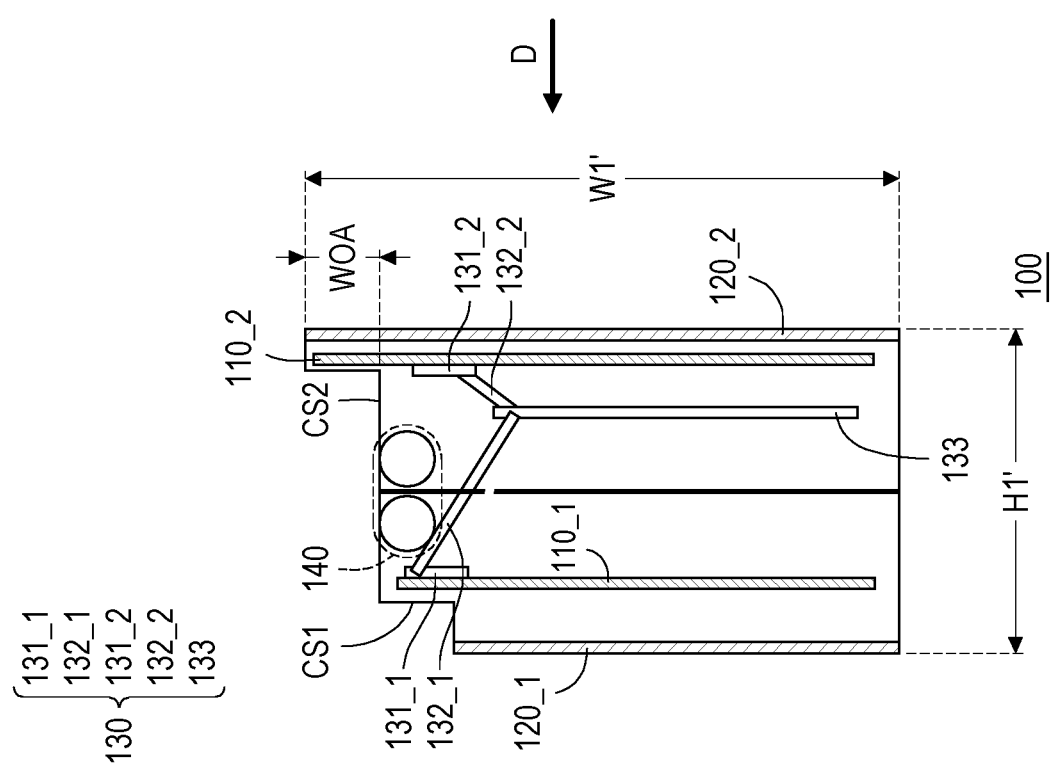
FIG. 3A is a side view illustrating the foldable detection device in a folded state according to the first embodiment of the disclosure.

With reference to FIG. 2A and FIG. 3A together, FIG. 3A is a side view illustrating the foldable detection device in the second state (folded state) according to the first embodiment of the disclosure. In this embodiment, when the foldable detection device 100 is in the folded state, the casing CS1 and the casing CS2 are stacked through the foldable structure 140. Therefore, in the direction D of the top view of the foldable detection device 100, the first detection panel 110_1 and the second detection panel 110_2 are located between the first cover plate 120_1 and the second cover plate 120_2. The first cover plate 120_1 and the second cover plate 120_2 at least partially overlap.

In addition, the foldable detection device 100 in the folded state has a maximum width W1' and a thickness H1'. It should be noted that the maximum width W1' is approximately one-half the width W1 plus a width WOA of the overlapping zone OA. When the foldable detection device 100 is in the folded state, the maximum width W1' is less than the width W1 of the foldable detection device 100 in the unfolded state, so the foldable detection device 100 may be easily moved or transported, and/or the risk of damage due to impact by foreign objects is reduced.

The length of the foldable detection device 100 in the folded state is substantially equal to the length L1 of the foldable detection device 100 in the unfolded state. The thickness H1' is approximately twice the thickness H1. After the foldable detection device 100 is switched from the unfolded state to the folded state, the thickness of the foldable detection device 100 increases by about 1.5 cm, but the disclosure is not limited thereto. Although the thickness H1' is greater than the thickness H1, it has little effect on the convenience of moving or transporting the foldable detection device 100 in the folded state.

In this embodiment, when the foldable detection device 100 is in the folded state, one of the first detection panel 110_1 and the second detection panel 110_2 may still be used to generate an image signal. That is, when being in the folded state, the foldable detection device 100 may still be used to generate one of the first image signal and the second image signal. Therefore, the foldable detection device 100 in the folded state may still be used for detection of small areas.

With reference to FIG. 2B and FIG. 3B together, FIG. 3B is a side view illustrating the foldable detection device in the folded state according to the second embodiment of the disclosure. In this embodiment, when the foldable detection device 200 is in the folded state, the casing CS1, the casing CS2, and the casing CS3 are stacked through the foldable structure 240_1 and the foldable structure 240_2, so that the casing CS1 is located between the casing CS2 and the casing CS3, but the disclosure is not limited thereto. Therefore, in the direction D of the top view of the foldable detection device 200, the first detection panel 210_1, the second detection panel 210_2, and the third detection panel 210_3 are located between the second cover plate 220_2 and the third cover plate 220_3. The third cover plate 220_3 and the second cover plate 220_2 at least partially overlap. Therefore, when the foldable detection device 200 is in the folded state, the third cover 220_3 and the second cover 220_2 can still protect the first detection panel 210_1, the second detection panel 210_2, and the third detection panel 210_3.

In addition, the foldable detection device 200 in the folded state has a maximum width W2' and a thickness H2'. It should be noted that the maximum width W2' may be approximately one third of the width W2 plus a width WOA1 of the overlapping zone OA1 and a width WOA2 of the overlapping zone OA2. When being in the folded state, the foldable detection device 200 may be easily moved or transported, and/or the risk of damage due to impact by foreign objects is reduced.

The thickness H2' is approximately 3 times the thickness H2. After the foldable detection device 200 is switched from the unfolded state to the folded state, the thickness of the foldable detection device 200 increases by about 3 cm, but the disclosure is not limited thereto. Although the thickness H2' is greater than the thickness H2, it has little effect on the convenience of moving or transporting the foldable detection device 200 in the folded state.

In this embodiment, when the foldable detection device 200 is in the folded state, one of the second detection panel 210_2 and the third detection panel 210_3 may still be used to generate an image signal. That is, when being in the folded state, the foldable detection device 200 may still be used to generate one of the second image signal and the third image signal. Therefore, the foldable detection device 200 in the folded state may be used for detection of small areas.

Figure 4:
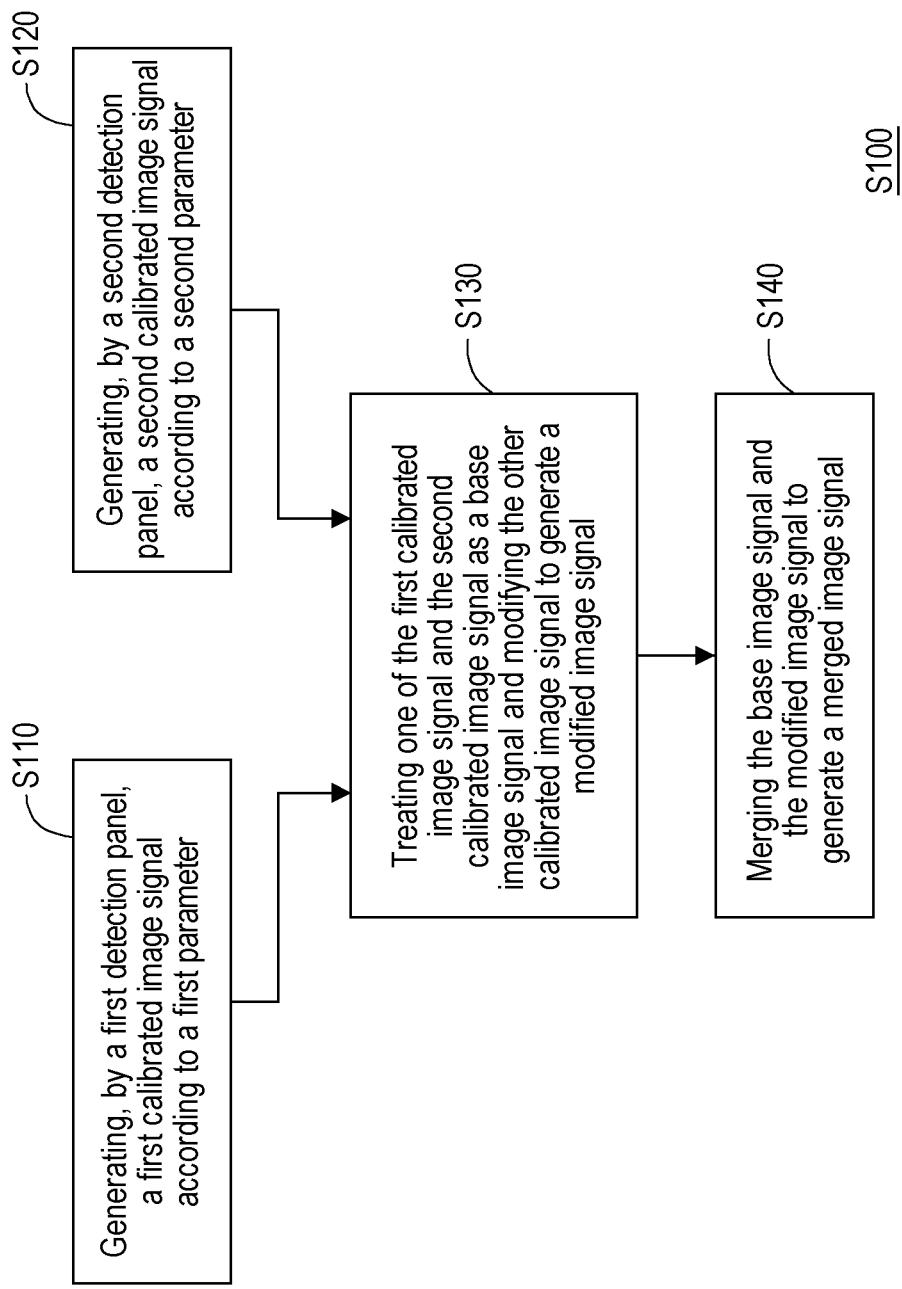
FIG. 4 is a flow chart illustrating an image signal processing method according to an embodiment of the disclosure.

With reference to FIG. 2A and FIG. 4 together, FIG. 4 is a flow chart illustrating an image signal processing method according to an embodiment of the disclosure. FIG. 4 illustrates an image signal processing method when the foldable detection device is in the unfolded state. An image signal processing method S100 is, for example, applicable to the foldable detection device 100. In step S110, the first detection panel 110_1 generates a first calibrated image signal according to a first parameter. In step S120, the second detection panel 110_2 generates a second calibrated image signal according to a second parameter. In this embodiment, based on the first parameter, a first calibrated image generated by the first calibrated image signal has good luminance uniformity. Based on the second parameter, a second calibrated image generated by the second calibrated image signal has good luminance uniformity.

In step S130, the foldable detection device 411 treats one of the first calibrated image signal and the second calibrated image signal as a base image signal and modifies the other calibrated image signal to generate a modified image signal. Since the sensitivity of the first detection panel 110_1 and the sensitivity of the second detection panel 110_2 may be different, reference luminance of the first calibrated image signal and reference luminance of the second calibrated image signal may be inconsistent. For instance, the reference luminance may be at least one of average luminance, maximum luminance, and minimum luminance. In this embodiment, the control board 133 may treat one of the first calibrated image signal and the second calibrated image signal as the base image signal and modifies reference luminance of the other calibrated image signal to generate the modified image signal. For instance, the first calibrated image signal is treated as the base image signal and the reference luminance of the second calibrated image signal is modified to generate the modified image signal, through modification made in step S130, the foldable detection device 100 may make the reference luminance of the base image signal and the reference luminance of the modified image signal approximately the same.

In step S140, the base image signal and the modified image signal are merged in the foldable detection device 100. In this embodiment, the control board 133 merges the base image signal and the modified image signal to generate a merged image signal.

Figure 5:
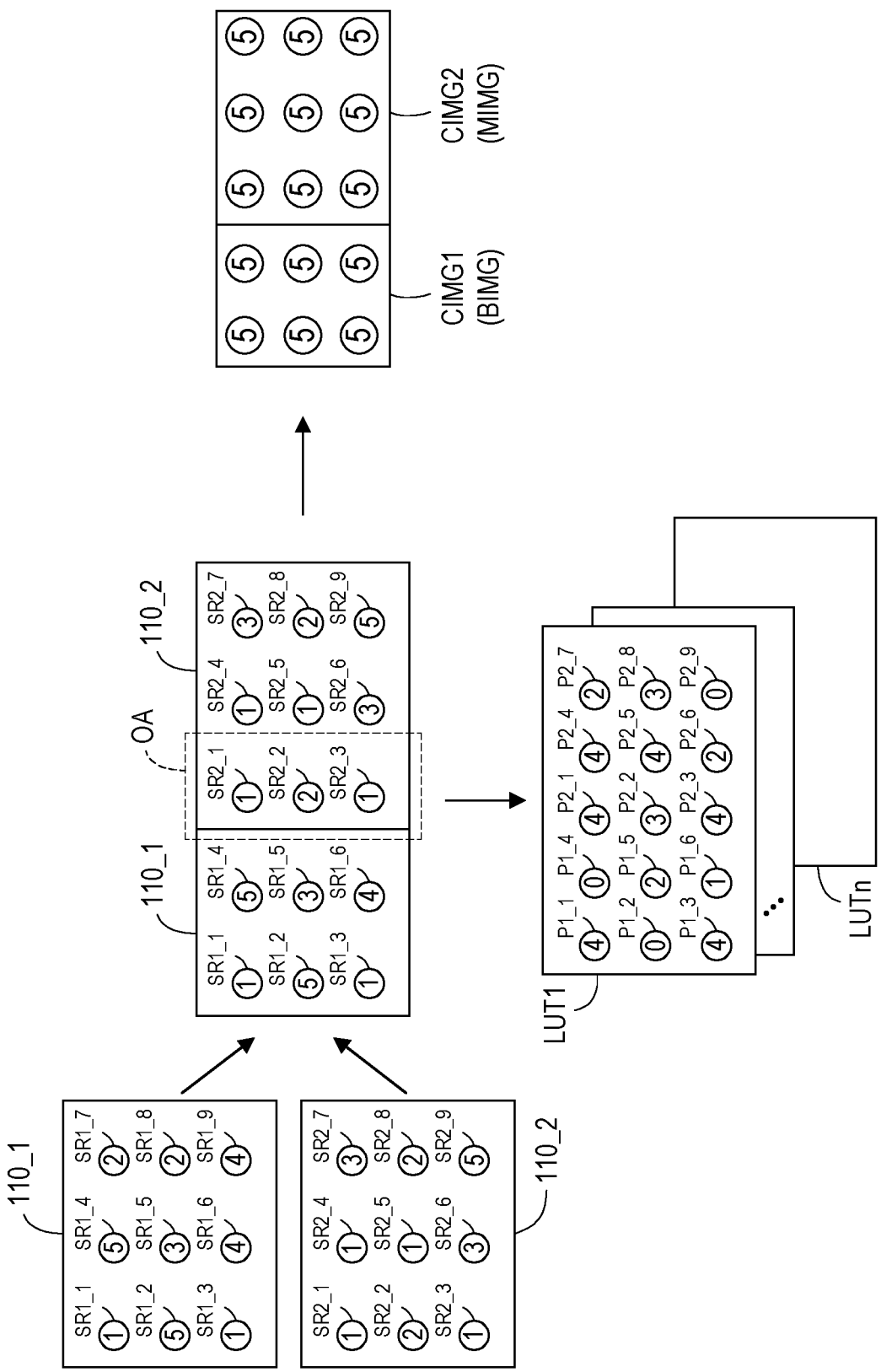
FIG. 5 is a schematic diagram illustrating image signal processing according to an embodiment of the disclosure.

With reference to FIG. 2A and FIG. 5 together, FIG. 5 is a schematic diagram illustrating image signal processing according to an embodiment of the disclosure. In this embodiment, each of the first detection panel 110_1 and the second detection panel 110_2 includes a plurality of sensing regions, and each sensing region may include, for example, at least one detection sub-pixel, but the disclosure is not limited thereto. When the first detection panel 110_1 and the second detection panel 110 receive the same X-ray intensity, ideally, each of the sensing regions may exhibit the same luminance result. When the first detection panel 110_1 and the second detection panel 110 receive different X-ray intensities, each of the sensing regions may exhibit different luminance results. As described above, due to the process difference between the first detection panel 110_1 and the second detection panel 110_2, when receiving the same X-ray intensity, the first detection panel 110_1 and the second detection panel 110 may exhibit different luminance results. For instance, when the first detection panel 110_1 and the second detection panel 110_2 receive the same X-ray intensity, sensing regions SR1_1 to SR1_9 of the first detection panel 110_1 may exhibit different reference luminances. Sensing regions SR2_1 to SR2_9 of the second detection panel 110_2 may exhibit different reference luminances. The reference luminances of the sensing regions SR1_1 to SR1_9 and the sensing regions SR2_1 to SR2_9 are represented by numerical values "1" to "5". For instance, a small numerical value represents a low reference luminance, and a large numerical value represents a high reference luminance, but the disclosure is not limited thereto. The sensing regions SR1_1 to SR1_9 and the sensing regions SR2_1 to SR2_9 correspond to different at least one detection sub-pixel. In this embodiment, the sensing region SR1_7, the sensing region SR1_8, the sensing region SR1_9, the sensing region SR2_1, the sensing region SR2_2, and the sensing region SR2_3 correspond to the overlapping zone OA.

Since the sensing regions SR1_1 to SR1_9 may exhibit different reference luminances under the same X-ray intensity, the first detection panel 110_1 needs to be calibrated through the first parameter to generate the first calibrated image signal. Since the sensing regions SR2_1 to SR2_9 may exhibit different reference luminances under the same X-ray intensity, the second detection panel 110_2 needs to be calibrated through the second parameter to generate the second calibrated image signal, so that the foldable detection device 100 can present an accurate image.

In this embodiment, the first parameter may correspond to a first look-up table (LUT) of the first detection panel 110_1. The second parameter may correspond to a second look-up table of the second detection panel 110_2. The first look-up table and the second look-up table may be integrated into an integrated look-up table LUT1. The reference luminances of the sensing regions SR1_1 to SR1_9 and the sensing regions SR2_1 to SR2_9 are integrated to generate the integrated look-up table LUT1 corresponding to the sensing regions SR1_1 to SR1_6 and the sensing regions SR2_1 to SR2_9. Parameters P1_1 to P1_6 and parameters P2_1 to P2_9 of the integrated look-up table LUT1 correspond to the sensing regions SR1_1 to SR1_6 and the sensing regions SR2_1 to SR2_9. For instance, if a reference luminance maximum value (e.g., numerical value 5) is treated as a base, the parameters P1_1 to P1_6 and the parameters P2_1 to P2_9 of the integrated look-up table LUT1 are modification values (or compensation values) that make the reference luminances of the sensing regions SR1_1 to SR1_6 and the sensing regions SR2_1 to SR2_9 reach the value "5". For instance, if the reference luminance of the sensing region SR1_1 is the numerical value "1", the numerical value of the parameter P1_1 is "4" (i.e., 5−1=4). If the reference luminance of the sensing region SR1_2 is the numerical value "5", the numerical value of the parameter P1_2 is "0" (i.e., 5−5=0), and the rest may be deduced by analogy. Therefore, the first detection panel 110_1 generates a first calibrated image signal CIMG1 (also referred to as a base image signal BIMG) according to the parameters P1_1 to P1_6. The second detection panel 110_2 generates a second calibrated image signal CIMG2 (also referred to as a modified image signal MIMG) according to the parameters P1_1 to P1_6. In this way, the reference luminance of the first calibrated image signal CIMG1 is substantially the same as the reference luminance of the second calibrated image signal CIMG2.

Further, in the overlapping zone OA, the position of the sensing region SR1_7 and the position of the sensing region SR2_1 overlap each other. The position of the sensing region SR1_8 and the position of the sensing region SR2_2 overlap each other. The position of the sensing region SR1_9 and the position of the sensing region SR2_3 overlap each other. The sensing regions SR1_7 to SR1_9 and the sensing regions SR2_1 to SR2_3 corresponding to the overlapping zone OA may be used as an alignment basis for splicing the first calibrated image signal CIMG1 (i.e., the base image signal BIMG) and the second calibrated image signal CIMG2 (i.e., the modified image signal MIMG). When the first calibrated image signal CIMG1 (i.e., the base image signal BIMG) and the second calibrated image signal CIMG2 (i.e., the modified image signal MIMG) are merged, the visual discontinuity of the first image generated by the first calibrated image signal CIMG1 (i.e., the base image signal BIMG) and the second image generated by the second calibrated image signal CIMG2 (i.e., the modified image signal MIMG) at the splicing position may be lowered.

The abovementioned image signal processing may be applied to the foldable detection device 100 in the unfolded state.

In this embodiment, in response to different process differences of the first detection panel 110_1 and the second detection panel 110_2, different reference luminances may be used as bases, and different integrated look-up tables LUT1 to LUTn may be generated.

Figure 6:
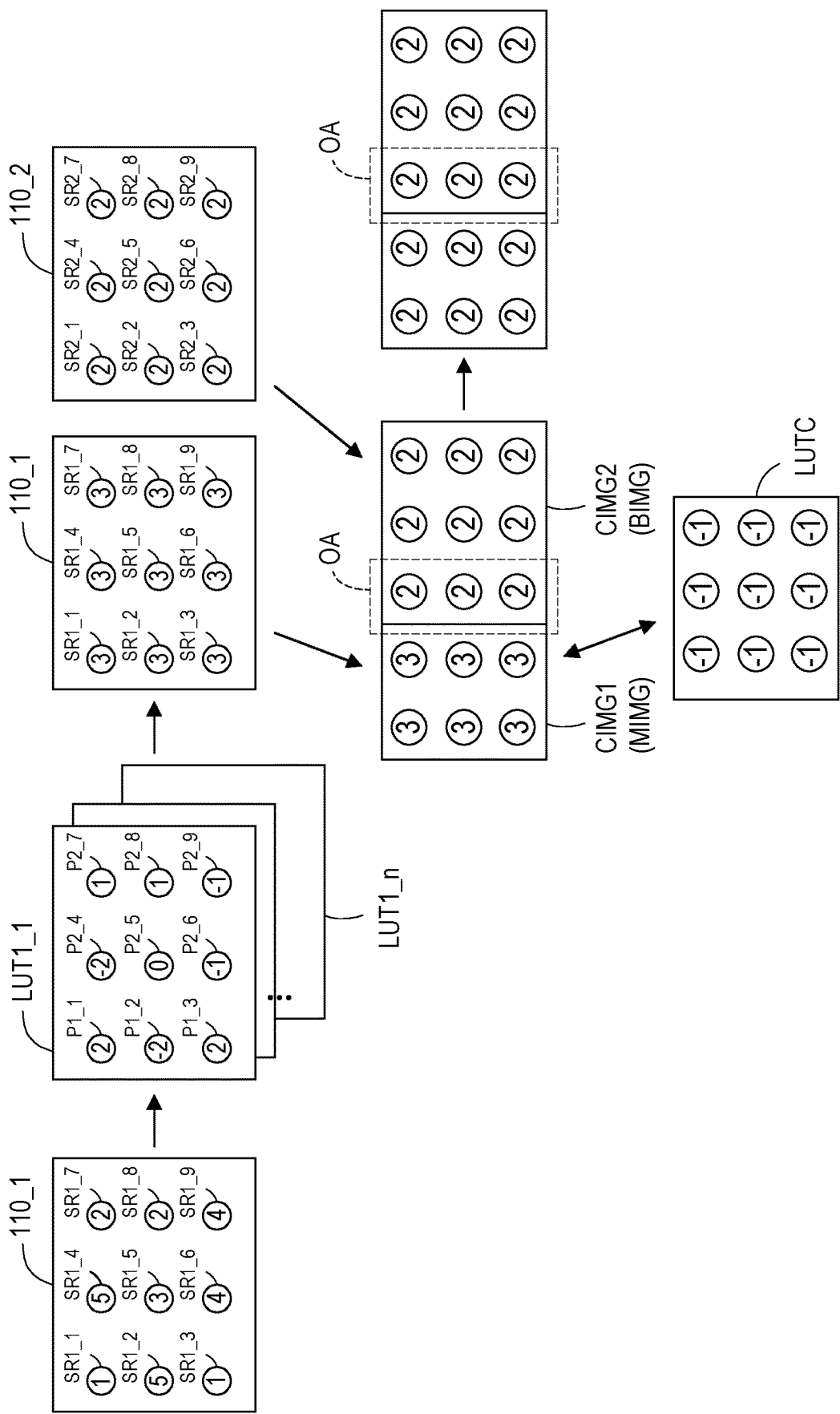
FIG. 6 is a schematic diagram illustrating image signal processing according to another embodiment of the disclosure.

With reference to FIG. 2A and FIG. 6 together, FIG. 6 is a schematic diagram illustrating image signal processing according to another embodiment of the disclosure. Taking the first detection panel 110_1 as an example, the first detection panel 110_1 includes sensing regions SR1_1 to SR1_9, and the sensing regions SR1_1 to SR1_9 include at least one detection sub-pixel. The reference luminances of the sensing regions SR1_1 to SR1_9 are represented by numerical values "1" to "5". For instance, a small numerical value represents a low reference luminance, and a large numerical value represents a high reference luminance, but the disclosure is not limited thereto. Due to the process difference between the first detection panel 110_1 and the second detection panel 110_2, when receiving the same X-ray intensity, different sensing regions of the first detection panel 110_1 and/or different sensing regions of the second detection panel 110 may exhibit different luminance results. For instance, when the first detection panel 110_1 and the second detection panel 110_2 receive the same X-ray intensity, the reference luminances displayed by the sensing regions SR1_1 to SR1_9 and the sensing regions SR2_1 to SR2_9 may be inconsistent. Therefore, the reference luminances of the sensing regions SR1_1 to SR1_9 may be integrated first to generate a look-up table LUT1_1 corresponding to the sensing regions SR1_1 to SR1_9. The parameters P1_1 to P1_9 of the look-up table LUT1_1 respectively correspond to the sensing regions SR1_1 to SR1_9. In an embodiment, the parameters P1_1 to P1_9 of the look-up table LUT1 may respectively make the reference luminances of the sensing regions SR1_1 to SR1_9 reach the modification value of the numerical value "3" when the X-ray intensity is the same, but the disclosure is not limited to the numerical value "3". For instance, if the reference luminance of the sensing region SR1_1 is the numerical value "1", the numerical value of the parameter P1_1 is "2" (i.e., 3−1=2). If the reference luminance of the sensing region SR1_2 is the numerical value "5", the numerical value of the parameter P1_2 is "−2" (i.e., 3−5=−2), and the rest may be deduced by analogy. Therefore, the reference luminance of the sensing regions SR1_1 to SR1_9 is approximately equal to "3". The first detection panel 110_1 generates the first calibrated image signal CIMG1 according to the parameters P1_1 to P1_9. In this way, the reference luminance of the first calibrated image signal CIMG1 is approximately equal to "3".

In response to the process difference of the first detection panel 110_1, different reference luminances may be treated as bases, and different look-up tables LUT1_1 to LUT1_n may be generated. The abovementioned image signal processing may be applied to the foldable detection device 100 in the folded state.

Similar to the operation of the first detection panel 110_1, when the X-ray intensity is the same, the reference luminance of the sensing regions SR2_1 to SR2_9 of the second detection panel 110_2 is approximately equal to "2".

It should be noted that the distance between the first detection panel 110_1 and the X-ray light source may be different from the distance between the second detection panel 110_2 and the X-ray light source. Therefore, the X-ray intensity detected by the first detection panel 110_1 and the X-ray intensity detected by the second detection panel 110_2 may be different. Taking this embodiment as an example, the distance between the first detection panel 110_1 and the X-ray light source is slightly greater than the distance between the second detection panel 110_2 and the X-ray light source. Therefore, even under the same X-ray intensity, the reference luminance of the first detection panel 110_1 and the reference luminance of the second detection panel 110_2 may be different. Therefore, when the first calibrated image signal CIMG1 and the second calibrated image signal CIMG2 are merged, the foldable detection device 100 may treat the second calibrated image signal CIMG2 of the second detection panel 110_2 as the base image signal BIMG and generate an integrated look-up table LUTC to modify the first calibrated image signal CIMG1 of the first detection panel 110_1 to generate the modified image signal MIMG. Taking this embodiment as an example, a plurality of parameters of the integrated look-up table LUTC are to modify the reference luminance of the sensing regions SR1_1 to SR1_9 from the numerical value "3" to the numerical value "2". Therefore, the abovementioned parameters of the integrated look-up table LUTC are all the numerical value "−1" (i.e., 2−3=−1). After modification, the reference luminance of the base image signal BIMG and the reference luminance of the modified image signal MIMG are approximately equal to the numerical value "2".

In addition, in the overlapping zone OA, the sensing regions SR1_7 to SR1_9 and the sensing regions SR2_1 to SR2_3 corresponding to the overlapping zone OA may be used as the alignment basis when the base image signal BIMG and the modified image signal MIMG are spliced. In this way, when the base image signal BIMG and the modified image signal MIMG are merged, visual discontinuity at the splicing position on the images generated by the base image signal BIMG and the modified image signal MIMG may be lowered.

In view of the foregoing, the foldable detection device provided by the disclosure may be used in the unfolded state and the folded state. In this way, when being in the folded state, the first detection panel and the second detection panel of the foldable detection device are suitable for large-area detection. In the folded state, the foldable detection device may be easily moved or transported. In the image signal processing method, the first detection panel generates the first calibrated image signal according to the first parameter, and the second detection panel generates the second calibrated image signal according to the second parameter. One of the first calibrated image signal and the second calibrated image signal are treated as the base image signal BIMG, and the other calibrated image signal to is modified generate the modified image signal MIMG. The base image signal BIMG and the modified image signal MIMG are then merged. In this way, when the images generated by the base image signal BIMG and the modified image signal MIMG are spliced into a merged image, visual discontinuity may be lowered.

It will be apparent to a person having ordinary skill in the art that various modifications and variations can be made to the disclosed embodiments without departing from the scope or spirit of this disclosure. In view of the foregoing, it is intended that the disclosure covers modifications and variations provided that they fall within the scope of the following claims and their equivalents.

What is claimed is:

1. A foldable detection device, used in an unfolded state and a folded state, wherein the foldable detection device comprises:
    a first detection panel; and
    a second detection panel,
    wherein when the foldable detection device is in the unfolded state, the first detection panel and the second detection panel partially overlap in a direction of a top view of the foldable detection device.

2. The foldable detection device according to claim 1, further comprising:
    a first cover plate, disposed on the first detection panel; and
    a second cover plate, disposed on the second detection panel.

3. The foldable detection device according to claim 2, wherein the first cover plate does not overlap with the second cover plate in the unfolded state.

4. The foldable detection device according to claim 2, wherein the first cover plate and the second cover plate are coplanar in the unfolded state.

5. The foldable detection device according to claim 2, wherein the first cover plate and the second cover plate comprise carbon fiber plates.

6. The foldable detection device according to claim 2, wherein in the folded state, the second cover plate and the first cover plate at least partially overlap in the direction of the top view of the foldable detection device.

7. The foldable detection device according to claim 2, wherein in the folded state, the first detection panel and the second detection panel are located between the first cover plate and the second cover plate in the direction of the top view of the foldable detection device.

8. The foldable detection device according to claim 1, wherein in the unfolded state, the first detection panel and the second detection panel generate image signals.

9. The foldable detection device according to claim 1, wherein in the unfolded state, the first detection panel and the second detection panel partially overlap in an overlapping zone.

10. The foldable detection device according to claim 9, wherein in the unfolded state, the first detection panel generates a first image signal, and the second detection panel generates a second image signal, wherein part of the first image signal and part of the second image signal corresponding to the overlapping zone are configured to perform image signal processing on at least one of the first image signal and the second image signal.

11. The foldable detection device according to claim 1, wherein in the folded state, one of the first detection panel and the second detection panel generates an image signal.

12. The foldable detection device according to claim 1, further comprising:
    a signal transmission structure, coupled to the first detection panel and the second detection panel.

13. The foldable detection device according to claim 1, further comprising:
    a first casing, wherein the first detection panel is disposed in the first casing;
    a second casing, wherein the second detection panel is disposed in the second casing; and
    a foldable structure, pivotally connected to the first casing and the second casing.

14. An image signal processing method for a foldable detection device, wherein the foldable detection device is used in an unfolded state and a folded state, wherein the foldable detection device comprises a first detection panel and a second detection panel, wherein the image signal processing method comprises:
    adjusting the foldable detection device to the unfolded state;
    generating, by the first detection panel, a first calibrated image signal according to a first parameter;
    generating, by the second detection panel, a second calibrated image signal according to a second parameter;
    treating one of the first calibrated image signal and the second calibrated image signal as a base image signal and modifying the other calibrated image signal to generate a modified image signal; and
    merging the base image signal and the modified image signal.

15. The image signal processing method according to claim 14, wherein the step of treating one of the first calibrated image signal and the second calibrated image signal as the base image signal and modifying the other calibrated image signal to generate the modified image signal comprises:
    treating one of the first calibrated image signal and the second calibrated image signal as the base image signal and modifying reference luminance of the other calibrated image signal,
    wherein the reference luminance is at least one of average luminance, maximum luminance, and minimum luminance.

16. The image signal processing method according to claim 14, wherein the step of generating, by the first detection panel, the first calibrated image signal according to the first parameter comprises:
    calibrating a plurality of reference luminances of a plurality of first sensing regions of the first detection panel according to the first parameter, such that the reference luminances of the first sensing regions of the first detection panel are the same; and
    generating the first calibrated image signal through the first sensing regions.

17. The image signal processing method according to claim 16, wherein the step of generating, by the second detection panel, the second calibrated image signal according to the second parameter comprises:
    calibrating a plurality of reference luminances of a plurality of second sensing regions of the second detection panel according to the second parameter, such that the reference luminances of the second sensing regions of the second detection panel are the same; and
    generating the second calibrated image signal through the second sensing regions.

18. The image signal processing method according to claim 17, wherein:
   the first parameter corresponds to a first look-up table of the first detection panel,
   the first look-up table comprises a plurality of modification values corresponding to the first sensing regions of the first detection panel, and
   the modification values of the first sensing regions are used to make the reference luminances of the first sensing regions reach a same value.

19. The image signal processing method according to claim 18, wherein:
   the second parameter corresponds to a second look-up table of the second detection panel,
   the second look-up table comprises a plurality of modification values corresponding to the second sensing regions of the second detection panel, and
   the modification values of the second sensing regions are used to make the reference luminances of the second sensing regions reach a same value.

20. The image signal processing method according to claim 19, further comprising:
   integrating the first look-up table and the second look-up table into an integrated look-up table.

\* \* \* \* \*